United States Patent [19]

Parulski et al.

[11] Patent Number: 5,402,170
[45] Date of Patent: Mar. 28, 1995

[54] HAND-MANIPULATED ELECTRONIC CAMERA TETHERED TO A PERSONAL COMPUTER

[75] Inventors: Kenneth A. Parulski, Rochester; Robert H. Hamel, Walworth; John J. Acello, East Rochester, all of N.Y.

[73] Assignee: Eastman Kodak Company, Rochester, N.Y.

[21] Appl. No.: 938,573

[22] Filed: Aug. 31, 1992

Related U.S. Application Data

[63] Continuation of Ser. No. 805,220, Dec. 11, 1991, abandoned.

[51] Int. Cl.⁶ ............................................. H04N 5/232
[52] U.S. Cl. .................................... 348/211; 348/376; 348/552
[58] Field of Search ............... 358/442, 479, 310, 335; 348/64, 211, 220, 376, 362, 552; H04N 5/232

[56] References Cited

U.S. PATENT DOCUMENTS

| | | | |
|---|---|---|---|
| 3,993,865 | 11/1976 | Browne et al. | 358/473 |
| 4,074,324 | 2/1978 | Barrett | 358/296 |
| 4,581,761 | 4/1986 | Ichinokawa et al. | 382/13 |
| 4,663,661 | 5/1987 | Weldy et al. | 358/44 |
| 4,714,963 | 12/1987 | Vogel | 358/909 |
| 4,738,526 | 4/1988 | Larish | 354/412 |
| 4,751,583 | 6/1988 | Levine | 358/256 |
| 4,805,037 | 2/1989 | Noble | 358/335 |
| 4,827,347 | 5/1989 | Bell | 358/210 |
| 4,849,811 | 7/1989 | Kleinerman | 358/903 |
| 4,855,813 | 8/1989 | Russell et al. | 358/22 |
| 4,858,014 | 8/1989 | Zeevi | 358/209 |
| 4,901,364 | 2/1990 | Faulkerson et al. | 382/59 |
| 4,903,132 | 2/1990 | Yamawaki | 358/209 |
| 4,942,477 | 7/1990 | Nakamura | 358/401 |
| 5,019,699 | 5/1991 | Koenck | 235/472 |
| 5,023,635 | 6/1991 | Nealon | 354/76 |
| 5,040,068 | 8/1991 | Parulski et al. | 358/209 |
| 5,065,229 | 11/1991 | Tsai et al. | 358/21 R |
| 5,086,344 | 2/1992 | D'Luna et al. | 358/213.15 |

FOREIGN PATENT DOCUMENTS

0308075 8/1988 United Kingdom .......... H04N 3/15

OTHER PUBLICATIONS

"User's Manual for Model 1 Digital Still Camera"; Dycam, Inc., 1991.
User's Manual—Kodak CCD 4000B Sync Camera, Eastman Kodak Co., Apr. 1991.

Primary Examiner—Howard W. Britton
Attorney, Agent, or Firm—David M. Woods

[57] ABSTRACT

A portable, electronic camera is connectable to a computer for capturing an image and providing the captured image to the computer for storage therewith. The camera ergonomically acts like an independent, self-functioning peripheral device while in actuality depending on instructions from the computer. The camera is remotely linked to the computer, e.g., by a cable, thereby allowing mobility of the camera independent of the computer. The camera includes an electronic image sensor, and circuit for driving the sensor to generate an image signal that is applied to the computer through the remote link. The readiness of the computer to accept an image signal is manifested by operative device in the camera, which condition the camera for image capture in response to a status signal from the computer transmitted through the remote link. In one embodiment, a capture switch is positioned on or with the camera for user engagement, whereby the operative device inhibits actuation of the capture switch until receipt of the status signal. In another embodiment, the operative device energizes an exposure readiness indicator when the status signal is received.

21 Claims, 4 Drawing Sheets

IMAGE NAME    NEW_IMAGES

MAX. NUMBER OF IMAGES    10

MEMORY REQUIRED:    1 MBYTES

MEMORY AVAILABLE:    5 MBYTES

[ OK ]  [ QUIT ]

COMPRESSION MODE

▣ COMPRESSION ON
☐ COMPRESSION OFF

RESOLUTION

▣ 768 X 512 PIXELS
☐ 384 X 256 PIXELS
☐ 192 X 128 PIXELS

COLOR MODE

▣ 24 BIT COLOR
☐ 8 BIT COLOR
☐ 8 BIT MONOCHROME

FIG. 4

HAND-MANIPULATED ELECTRONIC CAMERA TETHERED TO A PERSONAL COMPUTER

This is a continuation of application Ser. No. 805,220, filed Dec. 11, 1990, now abandoned.

BACKGROUND OF THE INVENTION

1. Field of the Invention

This invention pertains to the field of electronic imaging and, more particularly, to an image acquisition peripheral operated as an input device to a personal computer or professional workstation.

2. Background Art

Video cameras and computer frame grabbers are well known in the prior art. A typical system employs a video motion camera (such as the CCD 4000 RGB Flash-Sync Camera manufactured by Eastman Kodak Co., Rochester, N.Y.) and a frame grabber board (such as a TARGA ™ frame store board manufactured by True Vision, Inc., Indianapolis, Ind.) attached to the PC bus of a personal computer or professional workstation. The camera provides the timing to interface with the video frame store board by activating the frame acquire line of the frame store board whenever an external voltage input to the camera is dropped low (e.g., by dropping the "Camera Acquire In" line to the CCD 4000 camera). While the external voltage input may be separately and directly enabled, it is customary when using a video camera (such as the CCD 4000 camera) with a personal computer to design software to activate the camera's frame acquire line from the computer. To capture an image into the computer in such a customary application, the operator frames the subject while observing the live camera output on a video monitor, and then interacts with the computer keyboard at the proper moment. The need to use the computer keyboard frequently interferes with effective use of the camera.

Other known scanners that interact with a host computer include U.S. Pat. No. 4,901,364 (Faulkerson et al) and U.S. Pat. No. 4,581,761 (Ichinokawa et al). Faulkerson et al describes an interactive linear scanner system (for text) in which a hand-operated optical scanner includes a plurality of function keys that are user-programmable so as to assume certain functions that are ordinarily accessed through a keyboard. For instance, the function keys can be programmed to provide movement from field-to-field within a spreadsheet program while entering data using the scanner, without, e.g., requiring the user to use arrow keys on the computer keyboard. The camera exposure functions, however, such as control of a light source and the enablement of the optical scanning function, are controlled by a video processor located in the scanner. Moreover, the image data is edited to eliminate duplicative character information between successive image data frames. The edited frame data is then transmitted via data bus to a host computer. In Ichinokawa et al, a video processor is detached from a hand-operated scanner. A switch on the bottom of the scanner triggers the detached processor when the scanner is pushed down upon a document. The processor then receives image data and additional information (e.g., for switching from draw to erase, setting coordinates, and changing magnification) from the scanner, in turn providing processed data to a host computer.

As alluded to earlier, it is desirable to disassociate the camera from keyboard interaction to the extent possible. In one desirable application, a low cost electronic still camera would be tethered to a small, battery operated notebook or penpad personal computer which provides image processing, storage, and display of the captured images. By relying on the computer to perform these tasks, the camera cost can be greatly reduced. In such an application, the computer would typically be slung over the shoulder or rested on a table, while the user held the camera to compose the image. However, if the user must press buttons or pointers on the computer to capture each image, as is typical in the prior art, the system will be very unwieldy to use since the user will have to hold the camera in the right position with one hand, while operating the computer with the other hand.

By tethering the camera to the computer, as exemplified by the Faulkerson et al patent, it is possible to have both complex camera exposure functions and to control some computer functions from the camera itself. The complex camera exposure functions remain in the camera, however, which is contrary to the objective of low cost. Though it may be feasible, as done in the prior art, to download most complex processing to the computer, in effect slaving the camera to the computer, it is desirable to maintain the ergonomics of a hand-held camera, that is, to permit framing, exposure, flash, status indication, etc., without having to interact with the host computer. What is needed is a design for a tethered computer camera and associated computer software that allows the user to easily capture and store multiple images from the camera into the computer disk memory, without needing to interact with the computer at the instant each image is captured.

SUMMARY OF THE INVENTION

The invention pertains to a portable, electronic camera connectable to a computer for capturing an image and providing the captured image to the computer for storage therewith. In accordance with the invention, the camera ergonomically acts like an independent, self-functioning peripheral device while in actuality depending on instructions from the computer. The camera is linked by signal connection means to the computer, e.g., in one embodiment by a cable, thereby allowing mobility of the camera independent of the computer. The camera includes electronic image sensing means, and means for driving the sensing means to generate an image signal that is applied to the computer through the signal connection means. The readiness of the computer to accept an image signal is manifested by operative means in the camera, which condition the camera for image capture in response to a status signal from the computer transmitted through the signal connection means. In one embodiment, a capture switch is positioned on or with the camera for user engagement, whereby the operative means inhibits actuation of the capture switch until receipt of the status signal. In another embodiment, the operative means energizes an exposure readiness indicator when the status signal is received.

BRIEF DESCRIPTION OF THE DRAWING

The invention will be described in relation to the drawings, in which

FIG. 4 shows a typical menu selection presented to the user by the computer.

DESCRIPTION OF THE PREFERRED EMBODIMENTS

Figure 1:
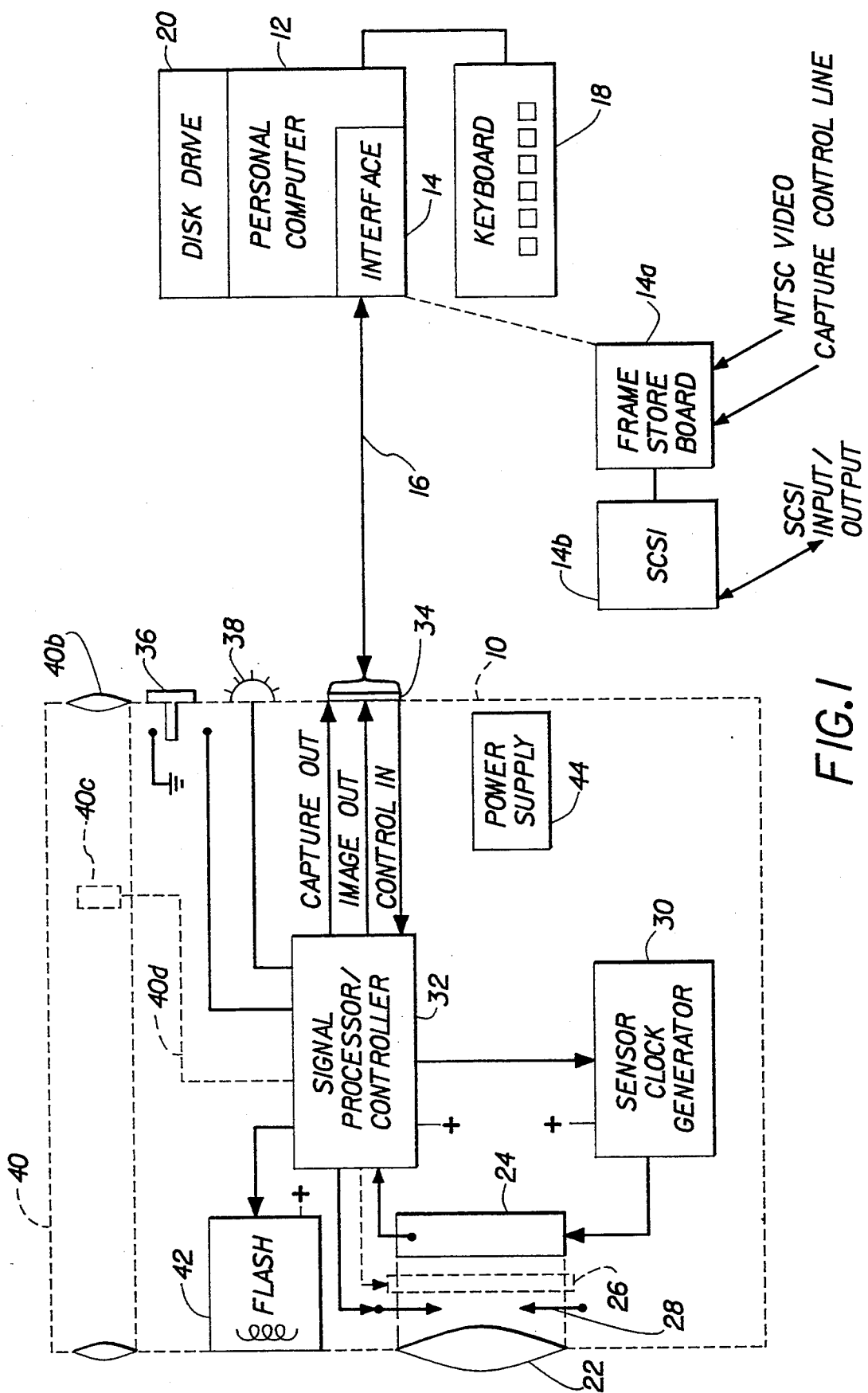
FIG. 1 is a schematic diagram of an image capture system for a computer, including a portable, electronic camera connected to a conventional personal computer according to the invention.

Referring first to FIG. 1, an electronic camera 10 is coupled to a personal computer 12 through a computer interface 14. The camera 10 is preferably remotely linked to the computer 12 with a cable 16, thus allowing a certain amount of mobility for the camera 10 independent of the computer 12. The interface 14 depends on the interface standard used; for example, if the interface standard accommodates an analog NTSC video signal, the interface 14 is typically a frame store board 14a, such as the aforementioned TARGA ™ board. Alternatively, a digital interface standard may be used; for instance, if the Small Computer System Interface (SCSI) is used, the interface 14 is a SCSI interface board 14b. The choice of interface, as will be shown, determines the type of signal processing employed in the camera 10. The computer 12 additionally includes a conventional keyboard 18 and a conventional disk drive 20, the latter being used to store pictures captured by the camera 10. Although not shown, the computer 12 includes the usual RAM storage for buffering incoming image data.

The camera 10 includes an optical system, represented by the lens 22, for directing image light from an object to an image sensor 24. The optical system may optionally include, in certain embodiments, a shutter 26 and a diaphragm 28 for regulating the quantity of image light exposed upon the image sensor 24. The sensor 24 is biased and driven by a sensor clock generator 30, which provides the signals used to clock an output image signal from the sensor 24. The output image signal is applied to a signal processor/controller 32, the complexity and type of processing and control varying according to the embodiment. The output of the signal processor 32 exits the camera through a connector 34, which accepts a suitable connector (not shown) on the cable 16. The camera 10 further includes a shutter button 36 for initiating either an exposure sequence or a frame capture, depending upon the embodiment; a status indicator 38, which may include a liquid crystal display (LCD) panel or a plurality of indicator lamps for indicating the status of the computer 12 to the user (that is, "ready" for another picture, or "busy" processing the just-taken picture) a viewfinder 40, which may be an optical viewfinder (as represented by the lens 40a, 40b) or an electronic viewfinder (as represented by the LCD display 40c connected by broken line 40d to the signal processor/controller 32); an electronic flash 42, which may be detachable or integrally formed with the camera; and a power supply 44 for powering the various circuits and electrically-powered components in the camera 10.

For purposes of broadly describing the functions of the camera 10, the signal processor/controller 32 is shown as outputting CAPTURE OUT and IMAGE OUT signals to the computer 12. In particular, the processor/controller 32 is operative to condition the camera for image capture in response to a CONTROL IN signal received from the computer 12. These signals are exemplary of the supported functions and are not meant to specify a minimum or maximum number of signals or signal connections. For instance, if the camera 10 provides a continuous stream of image signals, the CAPTURE OUT line is needed to single out one image frame for capture by the computer 12. Of course, depending upon the embodiment, this could be a separate signal (CAPTURE OUT) or it could be, e.g., a bit set in a header that travels with the image signal (IMAGE OUT). In the latter case, a separate CAPTURE OUT signal is unnecessary. If the camera 10 provides a single still-image signal (rather than a stream of image signals), the mere existence of an image signal on the IMAGE OUT line is determinative of the captured image. In that case, there is no need to communicate a separate CAPTURE OUT signal to single out a particular image frame.

A status signal on the CONTROL IN line controls usage of the shutter release 36 such that the shutter release 36 only activates a still capture, or pulses the CAPTURE OUT line, when the status signal is set. Several alternatives are possible: the status signal could illuminate the indicator lamp 38, passively showing that the shutter release 36 will have no effect until the lamp 38 is extinguished (i.e., continued depression of the shutter release 36 would not be recognized by the computer 12). Alternatively, the status signal could actively inhibit the shutter release 36, e.g., by preventing the generation of a CAPTURE OUT signal or the initiation of a still exposure. Moreover, the CONTROL IN line may have separate status signals for enabling the shutter release 36 and illuminating the lamp 38, or if the two states are mutually exclusive, the two conditions of a single binary status signal may manifest both states. Furthermore, in a preferred implementation, the CONTROL IN line includes several status components for illuminating several different status indicator lamps.

In one implementation of the invention, the sensor 24 is a scan rate video sensor producing a motion video signal and the signal processor/controller 32 includes a stage for converting the image signal into an analog NTSC video signal, which is transmitted through the connector 34 to the computer 12 as the IMAGE OUT signal. Typically the interface 14 in such an application is a framestore board 14a. In the implementation just mentioned, actuation of the shutter switch 36 pulses the CAPTURE OUT line, which is connected through the connector 34 to, e.g., the capture control line of the framestore board 14a. The framestore board 14a then captures a frame from the continuous video signal output on the IMAGE OUT line. An appropriate signal on the CONTROL IN line to the signal processor/controller 32 activates the shutter button 36, that is, allows the signal processor/controller 32 to output a capture pulse on the CAPTURE OUT line; likewise, appropriate signals on the CONTROL IN line energize appropriate indicator lights 38 to tell the user the status of the computer 12, that is, whether the computer 12 is ready to capture the next image, whether it is in the process of storing the present image to the disk drive 30, or whether the drive 20 is full.

Figure 2:
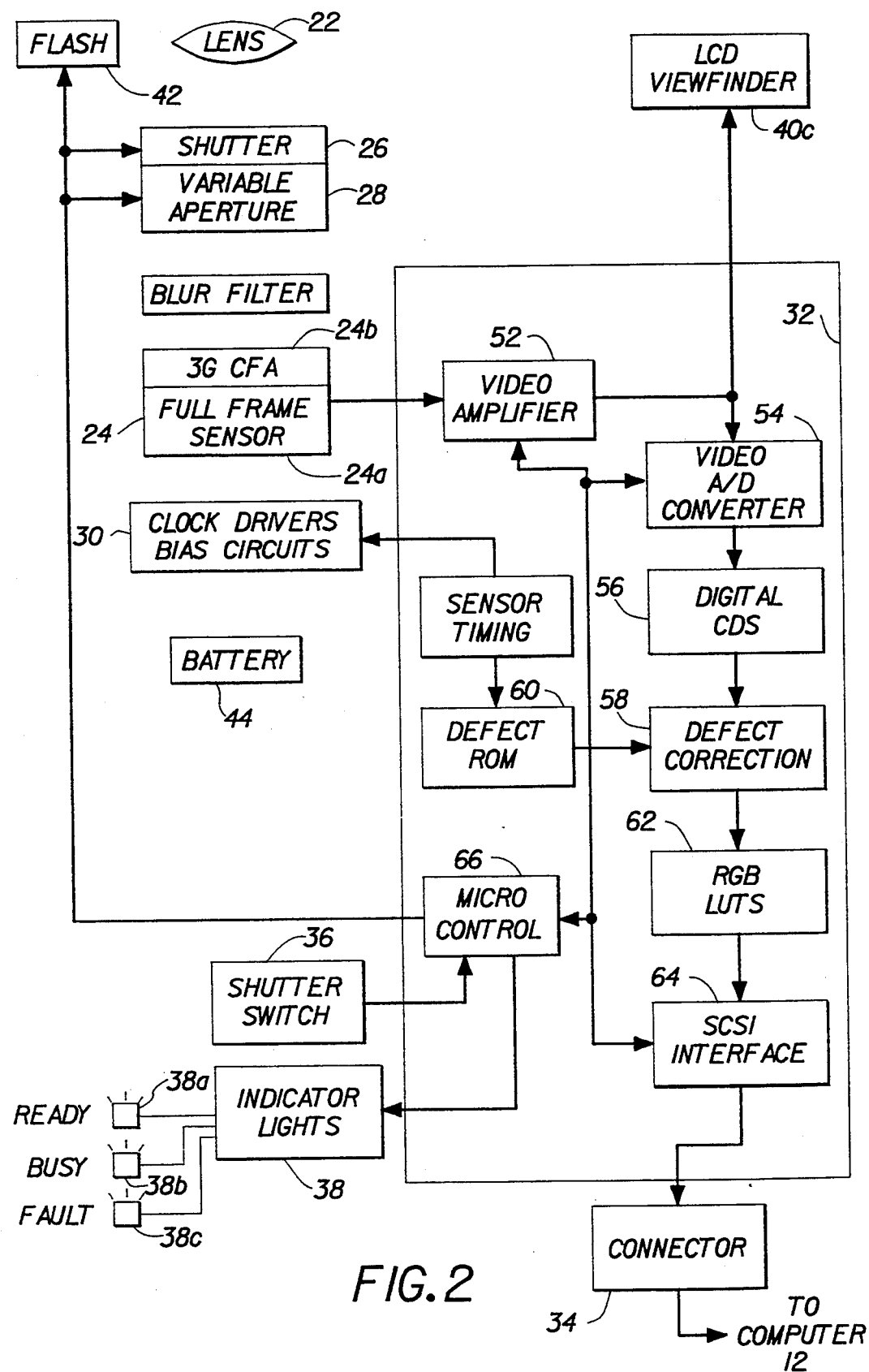
FIG. 2 is a block diagram of a preferred implementation of the camera illustrated in FIG. 1.

A second, preferred implementation of the invention, is shown in FIG. 2 in block diagram form wherein identical reference characters are used to identify components similar to those described in FIG. 1. In this implementation the signal processor/controller 32 generates a digital color image signal for application through the connector 34 to the SCSI interface board 14b (shown in FIG. 1). A still image signal is generated by the image sensor 24, which in this embodiment includes a full-frame sensor 24a, such as the Model KAF-0400 (768×512 pixels) manufactured by Eastman Kodak Company, and a "3-Green" color filter array 24b. The principle of the "3-green" color filter pattern, along with the concomitant use of a blur filter 50, such as a birefringent optical filter, is described in U.S. Pat. No. 4,663,661, "Single Sensor Color Video Camera with Blurring Filter" which is assigned to the same assignee as the present application and incorporated herein by reference. The signal processor/controller 32 includes a video amplifier 52, which applies an amplified video signal to a video analog/digital (A/D) converter 54. Sampling noise is removed from the digital video signal in a digital correlated double sampling circuit 56. (A suitable digital sampling circuit 56 is disclosed in Ser. No. 522,030, filed May 11, 1990, entitled "Digital Correlated Double Sampling Circuit for Sampling the Output of an Image Sensor", which is an allowed application assigned to the same assignee as the present application and incorporated herein by reference.) Imager defects are corrected in a defect correction stage 58 (the actual defect locations are stored in a defect ROM 60). Red, green, and blue look up tables (LUTs) 62 are provided for gamma correction and white balance. The output signals are converted to the SCSI standard by a SCSI interface 64 and transmitted through the connector 34 to the SCSI interface board 14b in the computer 12.

A programmed microprocessor-driven controller 66 provides the commands, instructions, and signals necessary to operate the camera, in particular responding to control inputs from the computer 12 through the SCSI interface 64 to initiate a still exposure sequence subject to actuation of the shutter switch 36. In other words, the controller 66 waits for instructions from the computer 12 before recognizing an input from the shutter switch 36. During the interim, indicator lamps 38a, 38b, 38c are illuminated to indicate the condition of the camera 10 relative to the computer 12. The indicator lamps are illuminated by a signal from the controller 66 pursuant either to specific instructions from the computer 12 or, particularly if only one lamp is used, by the absence of an enable signal for the shutter switch 36.

Figure 3:
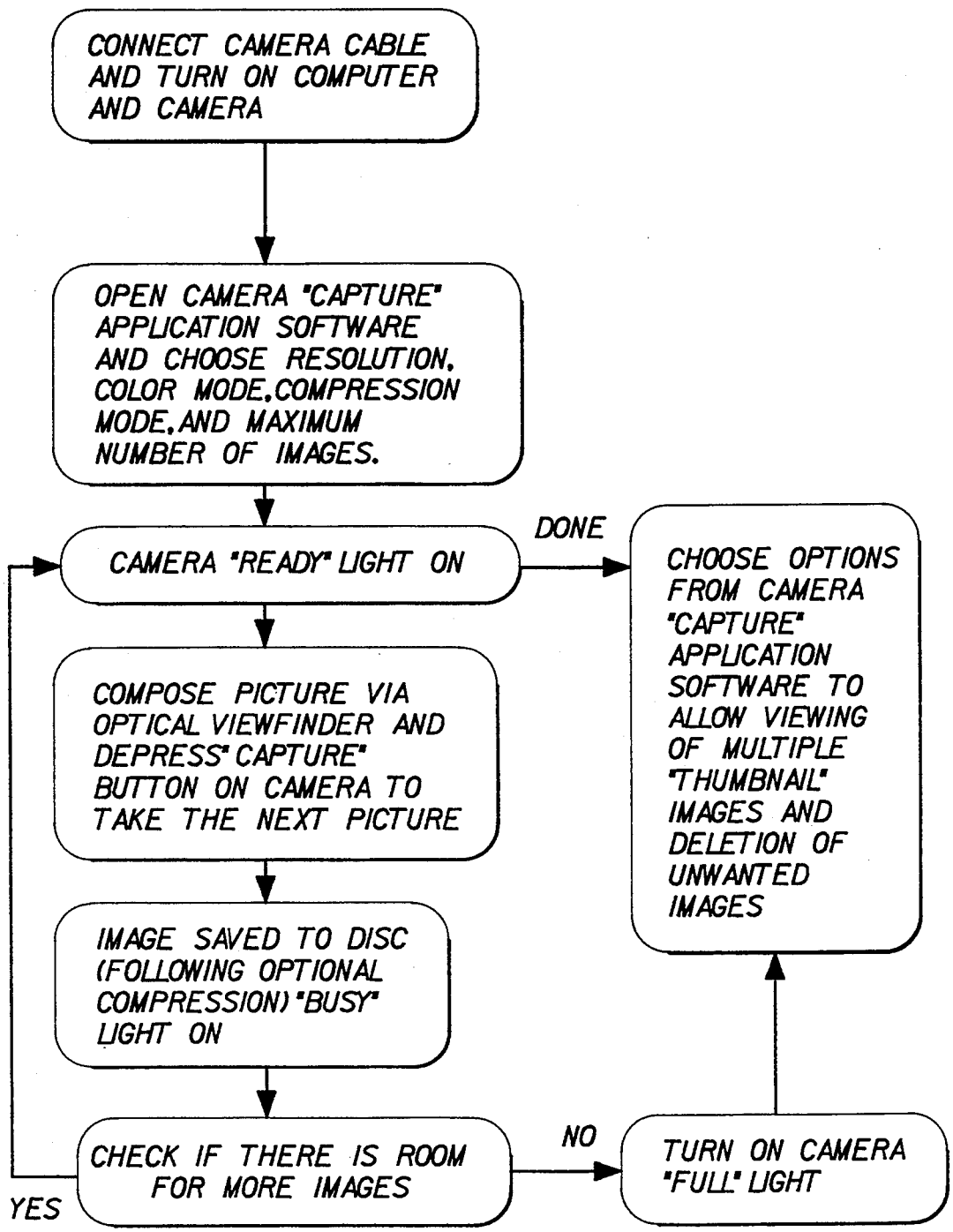
FIG. 3 is a flow diagram showing the operation of the camera of FIG. 2.

The camera shown in block form in FIG. 2 is particularly adapted for connection through a digital interface, such as a SCSI interface, to a small light-weight computer, such as a laptop computer with an LCD display and a large capacity hard disk drive. With that utility in mind, the operation of the camera of FIG. 2 is described in the self-explanatory flow-chart shown in FIG. 3. The user begins by connecting the camera 10 to the computer 12 and turning on the power supply 44. The user opens a "tethered camera" application program in the computer 12 and selects capture parameters from a menu shown in FIG. 4. The options can include the color mode (8 or 24 bit color or monochrome images), storing the full resolution images or lower resolution subsampled images (e.g. allowing the user the choice of full resolution (e.g., 512×768 pixel) images or lower resolution (e.g., 256×384, or 128×192 pixel) images, i.e., thereby using lower resolution to allow more images to be stored in the memory), storing compressed or uncompressed images, and so on. (A suitable image compression technique for images from a "3-green" color image sensor is disclosed in U.S. Pat. No. 5,065,229, "Compression Method and Apparatus for Single-Sensor Color Imaging Systems", which is incorporated herein by reference.) The user also specifies the image group name and the maximum number of images to be saved. The computer then calculates the required storage space to determine if the required amount of disk memory is sufficient. Once the selections are made, the camera "ready" lamp 38a is lit, and the user can close the computer (if required) and sling it over the shoulder while holding the camera.

The user frames the image and depresses the capture button 36. This begins a sequence which fires the flash 42 if required, actuates the shutter 26, and reads the digitized image sensor data, a line at a time, over the SCSI bus (connection 16) to the computer RAM memory. Depending on the capture options selected, the data is either stored directly from RAM to the hard disc 20 (or other non-volatile computer memory), is compressed using, e.g., the aforementioned known image compression method, etc. The first image is stored as image group name 1, and subsequent images are stored as image group name 2, image group name 3, etc. While this happens, the computer turns off the "ready" lamp 38a and illuminates the "busy" lamp 38b, so the user knows that the computer operations are occurring, without having to look at the computer display screen. Assuming that the current image number is less than the maximum number of images so that there is room to store more images (and that the flash has recharged if required), the "ready" lamp 38a is illuminated so that the user knows that the next image may be framed and captured. If the disk drive 20 (or other storage device) is full, or other problems are noted, then the "fault" lamp 38c is illuminated. The user then proceeds to substitute another disk (if drive 20 uses removable media), move or delete some images, or otherwise correct the problem, and the "ready" lamp 38a is again illuminated. If the storage medium is filled, a mosaic of small, "thumbnail" images may be produced on a single screen image of the computer's monitor to facilitate choice of unwanted images.

The invention has been described in detail with particular reference to a presently preferred embodiment, but it will be understood that variations and modifications can be effected within the spirit and scope of the invention. For instance, while analog and SCSI interfaces have been described, it is also feasible to use the parallel and serial ports conventionally available on a personal computer.

What is claimed is:

1. A portable, electronic camera connectable to a computer for capturing an image and providing the captured image to the computer for storage therewith, said camera comprising:

signal connection means for linking the camera to the computer;

means for sensing an image;

means for driving said sensing means to generate an image signal corresponding to the image, and for applying the image signal to said signal connection means for transmission to the computer;

operative means for conditioning the camera for image capture in response to the readiness of the computer for accepting an image signal, said operative means responsive to a status signal from the computer transmitted through said signal connection means, whereby the computer is adapted for storage of the image signal after providing the status signal; and exposure release mean connected to said driving means for initiating the generation of an image signal, thereby capturing an image, and wherein said operative means inhibits actuation of said exposure release means until receipt of said status signal indicates that the computer is ready to receive the image signal.

2. A camera as claimed in claim 1 wherein the camera further comprises a capture switch for outputting a capture command signal, and wherein said driving means generates a single image signal corresponding to a still image in response to the occurrence of the capture command signal and the receipt of the status signal from the computer.

3. A camera as claimed in claim 1 wherein the camera further comprises an exposure readiness indicator and wherein said operative means energizes said exposure readiness indicator when said status signal indicates that the computer is ready to receive the image signal.

4. A camera as claimed in claim 3 wherein said exposure readiness indicator has a plurality of indicator states and wherein the status signal has a plurality of components each actuating a corresponding one of said indicator states to show that the computer is ready to receive an image signal, that the computer is busy processing an image signal, and that a storage device in the computer is full.

5. A camera as claimed in claim 1 wherein the image signal generated by said driving means comprises a stream of image signals corresponding to a stream of consecutive images, and wherein the camera further comprises a capture switch for outputting a capture command signal to the computer to identify an image signal selected from the stream of image signals.

6. A camera as claimed in claim 5 for use with a computer including a framestore capture circuit having a capture input for initiating the capture of an image, and wherein;
the capture command signal output by said capture switch is applied to the capture input of the framestore capture circuit in order to initiate the capture of a particular image signal.

7. A camera as claimed in claim 1 wherein specific image capture options are specified through interaction with the computer, and wherein said driving means outputs a common image signal that is subsequently configured in the computer according to the specified capture options.

8. A camera as claimed in claim 7 wherein the specific image capture options are used for a multiplicity of images.

9. A camera as claimed in claim 7 wherein said image capture options include storage of either a full resolution image or a subsampled image.

10. A camera as claimed in claim 7 wherein said sensing means includes a color filter array for generating color-responsive signals and said image capture options include storage of either a color or a monochrome image.

11. A portable, electronic camera connectable to a computer for capturing an image and providing the captured image to the computer for storage therewith, said camera comprising:
signal connection means for remotely linking the camera to the computer, thereby allowing mobility of the camera independent of the computer;
means for sensing an image;
means for driving said sensing means to generate an image signal corresponding to the image, and for applying the image signal to said signal connection means for transmission to the computer;
means for indicating the readiness of the computer for accepting an image signal, said indicating means responsive to a status signal from the computer transmitted through said signal connection means; and
a capture switch for outputting a capture command signal for initiating the capture of an image signal corresponding to a selected image, whereby the computer initiates storage of the image signal after providing the status signal and receiving the capture command signal.

12. A camera as claimed in claim 11 for use with a computer including a framestore capture circuit having a capture input for actuating the capture of an image, and wherein;
said driving means generates a series of image signals corresponding to a series of images; and
the capture command signal output by said capture switch is applied to the capture input of the framestore capture circuit in order to initiate the capture of a particular image signal.

13. A camera as claimed in claim 11 wherein said readiness indicating means toggles between two states indicating whether or not the computer is ready to accept an image signal, and wherein said capture switch is rendered effective in outputting a capture command signal after said readiness indicating means has changed to the state indicating that the computer is ready to accept an image signal.

14. A camera as claimed in claim 11 further including a cable interface connecting said signal connection means with the computer whereby the camera remains tethered to the computer.

15. A portable electronic camera connectable to a computer through a peripheral interface for capturing an image and providing the captured image over the interface for storage with the computer, said camera comprising:
means for sensing an image and generating an image signal;
an interface controller for controlling the transmission of data between the camera and the computer;
a capture switch for generating a capture signal that initiates a still exposure;
means responsive to (a) a control signal from the computer transmitted through the interface controller for enabling said sensing means to generate a still image signal and (b) actuation of said capture switch for triggering the enabled sensing means to capture a desired still image; and
status indicator means responsive to a status signal from the computer transmitted through the interface controller for indicating when the computer is ready to accept a still image signal.

16. A camera as claimed in claim 15 wherein said status signal is included with said control signal.

17. A portable, electronic camera connectable to a computer for capturing an image according to image capture options specified by the computer and providing the captured image to the computer for storage therewith, said camera comprising:
signal connection means for remotely attaching the camera to the computer and thereby allowing mobility of the camera independent of the computer;

means for sensing an image;

means for driving said sensing means to generate an image signal corresponding to the image regardless of specified image capture options, and applying said image signal to said signal connection means;

a viewfinder for viewing a plurality of images in order to select a desired image; and a capture switch for initiating the capture of an image signal and transmission thereof to the computer through said signal connection means, whereby the computer processes the desired image according to the specified capture options after receipt of the capture command signal.

18. A camera as claimed in claim 17 wherein said capture options include the choice of either full resolution or subsampled resolution, or color or monochrome reproduction.

19. A system including a camera and a computer for capturing a still electronic image, said system comprising:

a) a portable camera connectable to the computer for capturing the image and providing the captured image to the computer for storage therewith, said camera comprising:

1) signal connection means for linking the camera to the computer;

2) means for sensing an image, said sensing means having a maximum resolution and being capable of producing a color output;

3) means for driving said sensing means to generate an image signal corresponding to the image, and for applying the image signal to said signal connection means for transmission to the computer; and 4) operative means for conditioning the camera for image capture in response to the readiness of the computer for accepting an image signal, said operative means responsive to a status signal from the computer transmitted through said signal connection means, whereby the computer is adapted for storage of the image signal after providing the status signal; and b) a computer connectable to the camera for storing the image according to specified options dependent upon processing of the image signal, said computer comprising:

1) an image compression algorithm providing at least one mode of compression;

2) means for selecting a specific image processing option, including the mode of compression, the resolution of the captured image as derived from the image signal, and the processing of color or monochrome images from the image signal; and 3) means for generating and transmitting the status signal to the camera.

20. A system as claimed in claim 19 wherein the specified image processing options include application of the specified options to a plurality of images.

21. A system as claimed in claim 19 wherein the specified image processing options include the ability to limit the maximum number of captured images.

* * * * *